(12) United States Patent
Chung et al.

(10) Patent No.: US 9,098,836 B2
(45) Date of Patent: Aug. 4, 2015

(54) RICH EMAIL ATTACHMENT PRESENTATION

(75) Inventors: Wook Jin Chung, Kirkland, WA (US); Pritesh Patwa, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 152 days.

(21) Appl. No.: 12/947,070

(22) Filed: Nov. 16, 2010

(65) Prior Publication Data

US 2012/0124143 A1   May 17, 2012

(51) Int. Cl.
G06F 15/16 (2006.01)
G06Q 10/10 (2012.01)
H04L 12/58 (2006.01)

(52) U.S. Cl.
CPC .............. *G06Q 10/107* (2013.01); *H04L 51/08* (2013.01); *H04L 51/18* (2013.01)

(58) Field of Classification Search
CPC ...... G06Q 10/107; G06Q 10/10; H04L 51/08; H04L 51/066; H04L 51/063; H04L 51/18; H04L 51/22
USPC .......................................... 709/206, 203, 236
See application file for complete search history.

(56) References Cited

U.S. PATENT DOCUMENTS

| | | | |
|---|---|---|---|
| 2002/0087601 A1 | 7/2002 | Anderson et al. | |
| 2005/0192992 A1* | 9/2005 | Reed et al. | 707/101 |
| 2007/0081197 A1* | 4/2007 | Omoigui | 358/403 |
| 2007/0143421 A1 | 6/2007 | Vuong et al. | |
| 2008/0244750 A1 | 10/2008 | Romero | |
| 2008/0256199 A1 | 10/2008 | Pesala | |
| 2008/0270543 A1 | 10/2008 | Bhamidipaty et al. | |
| 2009/0157820 A1* | 6/2009 | Sampang et al. | 709/206 |
| 2009/0210778 A1* | 8/2009 | Kulas et al. | 715/201 |
| 2009/0210779 A1 | 8/2009 | Badoiu et al. | |
| 2010/0100815 A1 | 4/2010 | Hutchinson et al. | |
| 2010/0278453 A1* | 11/2010 | King | 382/321 |
| 2011/0185024 A1* | 7/2011 | Ramarao et al. | 709/206 |

FOREIGN PATENT DOCUMENTS

| | | |
|---|---|---|
| CN | 1584906 A | 2/2005 |
| CN | 1584906 A1 | 2/2005 |

(Continued)

OTHER PUBLICATIONS

Knichel, Mark, "Gmail Labs graduation and retirement"—Published Date: Feb. 24, 2010 http://gmailblog.blogspot.com/2010/02/gmail-labs-graduation-and-retirement.html.

(Continued)

*Primary Examiner* — Ruolei Zong
(74) *Attorney, Agent, or Firm* — Aneesh Mehta; Kate Drakos; Micky Minhas

(57) ABSTRACT

One or more techniques and/or systems are disclosed for providing a rich email experience for an email with an attachment. Intention metadata that is associated with an attachment to an email is identified, where the intention metadata indicates a sender intention for the attachment. The intention metadata may be identified prior to sending the email and included with the email, or identified after receipt of the email. Further, the intention metadata is applied to the attachment so that the attachment is presented in a rich format to the recipient that reflects the sender intention for the attachment, such as highlighting portions, and/or presenting images, for example, in a desired sequence.

20 Claims, 9 Drawing Sheets

(56) References Cited

FOREIGN PATENT DOCUMENTS

| CN | 101079846 A | 11/2007 |
|---|---|---|
| CN | 101155153 A | 4/2008 |
| EP | 1802055 A1 | 6/2007 |

OTHER PUBLICATIONS

Chinese Office Action cited in Chinese Application No. 201110363006.1 dated Dec. 20, 2013, 2 pgs.
Third Chinese Office Action cited in Chinese Application No. 201110363006.1 dated Feb. 6, 2015, 5 pgs.
Reply first Chinese Office Action cited in Chinese Application No. 201110363006.1 dated Mar. 28, 2014, 2 pgs.
Second Chinese Office Action cited in Chinese Application No. 201110363006.1 dated Aug. 1, 2014, 2 pgs.
Reply Second Chinese Office Action cited in Chinese Application No. 201110363006.1 dated Oct. 8, 2014, 3 pgs.

* cited by examiner

200 ⟶

Hi Dave,
    Please take a look at the carpet designs attached. Design1.jpg is the Endurance brand in a tropical sky design; and Design2.jpg is the Lastmore brand in an ocean view design.

Give me a call if you have any questions.

Thanks.
Tom

```
>>>>>>>>>>>>>>>>>>>>>>>>>
<Highlight>
    <File> Design1.jpg </File>
    <Type> BoxZoom </Type>
    <Coordinates> 24;56;300;250 </Coordinates>
</Highlight>
<Highlight>
    <File> Design2.jpg </File>
    <Type> BoxZoom </Type>
    <Coordinates> 137;60;100;100 </Coordinates>
</Highlight>
>>>>>>>>>>>>>>>>>>>>>>>>>
```

FIG. 2A

RICH EMAIL ATTACHMENT PRESENTATION

BACKGROUND

Emails are electronic communication between online users (e.g., those connected to the Internet and/or a network) that can be generated and/or received using online email providers, or email applications. One or more files can be attached to an email, such as in order to transfer the file from a sender to a recipient, and may comprise word-processor document, images, applications, or just about any other type of computer-based files. Email attachments are a convenient method to transfer data to another a person, and per e-mail standards, one or more files may be attached to an e-mail which can be directed to one or more e-mail addresses.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One of the short-comings of current email service is that it may not provide a desired presentation (e.g., in a format intended by the sender) of the attached file. For example, a standard JPG image file does not have a notion of supporting a description of who is in the picture and the scenario of when/where the picture was taken, and/or a desired sequence of viewing for a plurality of images. Although such additional information may be useful when passing the picture along, and may be an intention of the sender, the JPG file type merely presents the image. Other than describing their intention for an attached file in a body of the email, current email system to not provide for a way for the sender to augment the attachment.

Generally, current and previous email systems are agnostic about a type of file that is attached to the email, and do not account for the sender's intentions for the attachment(s) with regard to the recipient (e.g., view in a particular sequence, view merely specified portions of the document, etc.). Currently, attachments are typically left to the recipient's discretion to be used as the sender intended.

Accordingly, one or more techniques and/or systems are disclosed for providing email delivery with a sender desired presentation of attachments. For example, metadata format may be used by email providers (e.g., online providers of email service) or e-mail applications (e.g., local applications that provide email services) to present email attachments in a richer format. For example, the email (e.g., header and/or body) may contain this information, or the metadata can be added as another attachment in a standard language (e.g., markup language based code). In this way, for example, important portions of documents may be highlighted, sections of a photo can be annotated, attachments can be viewed in a desired sequence, and/or attachment open/download confirmations can be provided in the received email, or upon opening of the attachment, etc.

In one embodiment for providing a rich email experience for an email with an attachment, intention metadata associated with an attachment to an email is identified, where the intention metadata indicates a sender intention for the attachment, such as how the attachment should be presented. Further, the intention metadata is applied to the attachment such that a recipient can identify the sender intention for the attachment.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIGS. 2A, 2B and 2C illustrate exemplary embodiments where one or more techniques described herein may be implemented.

DETAILED DESCRIPTION

Figure 1:
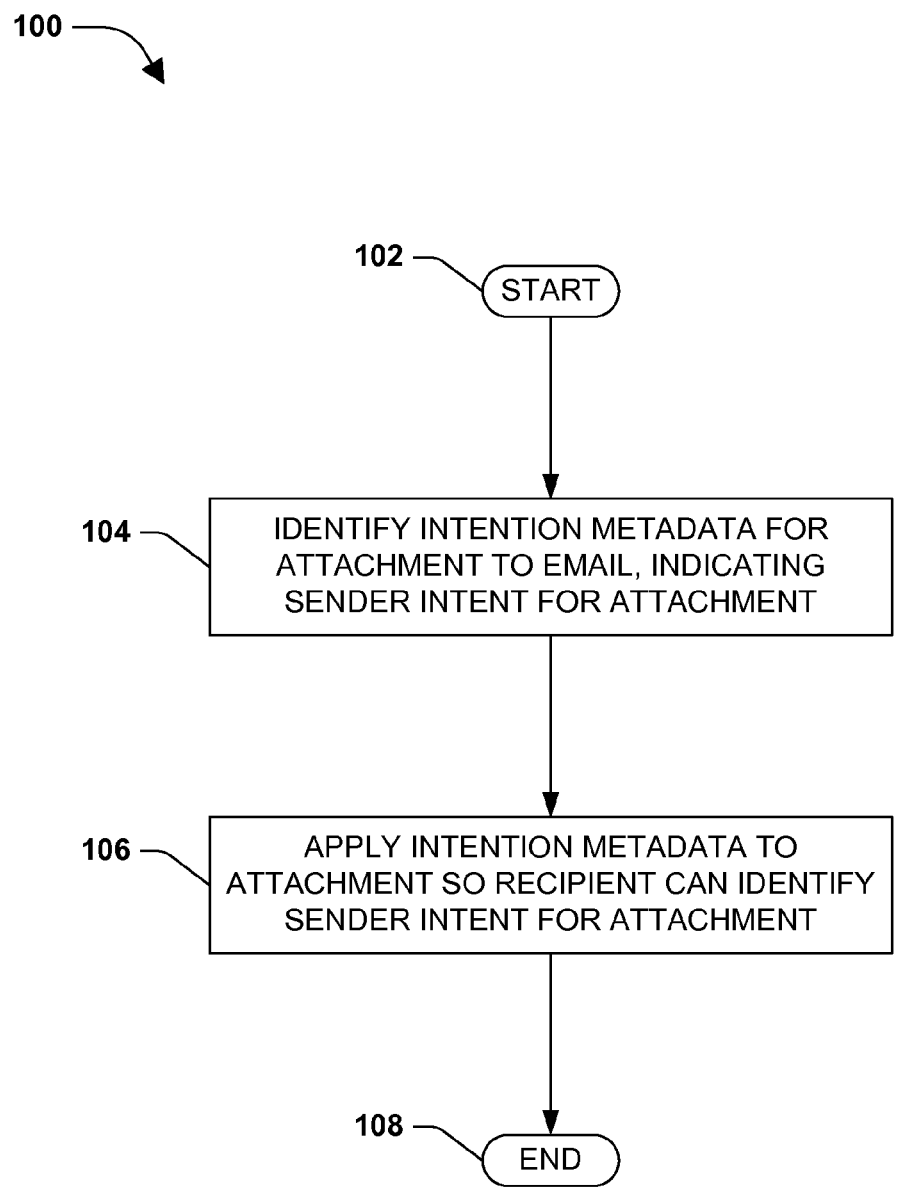
FIG. 1 is a flow diagram of an exemplary method for providing a rich email experience for an email with an attachment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for presenting email attachments in a richer format than current and previous techniques and/or systems. An agreed upon metadata format may be used by an e-mail provider, or e-mail application, that can present e-mail attachments in a richer format. For example, an e-mail body can contain metadata, or the metadata can be added as another attachment in a standard code language, such as XML. Utilizing these techniques, for example, may allow for highlighting of important portions of documents, annotating sections of a photo, sequencing attachment viewing, and/or attachment open/download confirmations, among other things.

FIG. 1 is a flow diagram of an exemplary method 100 for providing a rich email experience for an email with an attachment. The exemplary method 100 begins at 102 and involves identifying intention metadata that is associated with an attachment to an email, at 104. Here, the intention metadata is an indication of a sender intention for the attachment. For example, when a sender of an email attaches a file the sender intends for a recipient of the email to do something with the file. Typically, senders do not attach files for no reason, for example, they often want the recipient to read, view, edit, and/or perform some other action to at least a portion of the attachment.

As an illustrative example, the sender may compile a number of pictures, such as from a vacation, and send them to the recipient with a note in the email body that asks the recipient to take a look at these pictures in order, and look at my dog who is doing something funny in the third picture. In this example, the sender intent can be characterized as opening the pictures in a particular order, and viewing his dog in the third picture. As another illustrative example, the sender may send a word processor generated document that has been edited in three locations, and writes in the body of the email for the recipient to look at the edits in the second paragraph of page 7, the third paragraph of page 23, and the fifth paragraph of page 48. In this example the sender intent can be characterized as opening the document and navigating to the respective pages and paragraphs where the edits have been made.

In one embodiment, the intention metadata can be identified before the email is sent, and/or after the email is received. For example, intention metadata may be automatically (e.g., programmatically) retrieved from the body portion, for example, of an email prior to the message being sent. In one embodiment, a natural language search, for example, of the email body may provide indications of the sender's intention for the attachment. In this embodiment, the information identified by the search can be used to generate intention metadata, which can be sent with the email to the recipient.

As another example, the intention metadata can be identified when the email is received, such as by an email provider (e.g., online provider) or email application (e.g., email program resident on a client machine). In one embodiment, the metadata may be identified in a metadata attachment to the email (e.g., along with the sender's attachment(s)), as code written in the body or header of the email, and/or from a search for intention indicators in the email body.

At 106 in the exemplary embodiment 100, the intention metadata is applied to the attachment, in a way that identifies the sender intention for the attachment to the recipient. For example, as described above, the sender intention can comprise what the sender intends for the recipient to view with regards to the attachment. In one embodiment, the metadata can be applied to the attachment such that a richer presentation of the attachment is provided to the recipient.

As an illustrative example, the metadata may identify that the sender wishes for the recipient to open vacation pictures in a particular order, and highlight a particular portion of one of the pictures. In this example, when the metadata is applied to the attached pictures (e.g., as markup code), the pictures may run in a slideshow presentation, such as in the email or when activated by the recipient, and the portion of the picture that has the sender's dog can be highlighted (e.g., as a box zoom detail). As another illustrative example, the metadata may identify that the sender wishes for the recipient to review several edits to the attached document. In this example, the metadata can be applied to the document, where merely the desired portions of the document are displayed for the recipient, such as in the email body or in a separate document when the attachment is activated.

Having applied the intention metadata to the attachment, the exemplary method 100 ends at 108.

Figure 2B:
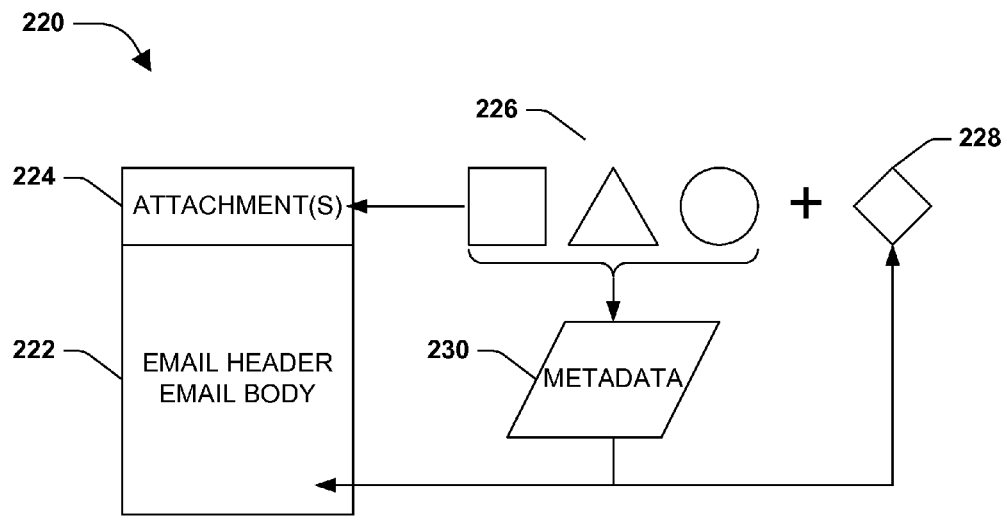

FIGS. 2A and 2B illustrate exemplary embodiments 200 and 220 where one or more techniques described herein may be implemented. For purposes of illustration and not limitation FIGS. 2A and 2B are described in reference to FIG. 3, which is a flow diagram illustrating an example embodiment 300 of one or more portions of a method for providing a rich email experience for an email with an attachment. At 302 in the example embodiment 300, a sender creates (e.g., or updates) a document 350 in a supporting application. For example, the sender may create or edit a text-based document using a word processing application, or edit an image using a photo-editing application.

At 304, the sender composes an email to the recipient and attaches the attachment at 306. For example, the email may be written using an online email provider or using a local email application. At 308, intention metadata can be identified for the attachment. In one embodiment, the intention metadata can be generated for the attachment. In one embodiment, the intention metadata can be identified from intention metadata generated by an application that supports the attachment, at 310.

For example, the application used by the sender to create or update the attachment 350 (doc) may also be used to generate the intention metadata. As an illustrative example, the sender may create a text-based document using a word processing application. Typically, word-processing applications provide for highlighting areas or the document, adding comments, and/or calling out edits, for example. In this example, the sender may apply review-type indications (e.g., comments, highlights, edits, etc.) to portions of the document, and the application can automatically (e.g., programmatically) generate intention metadata for these review-type indications. As another example, the application may provide a means for asking the user if they wish to indicate intention(s) for the document (e.g., using a menu option), which can guide the sender in generating intention metadata for the document.

In one embodiment, generating intention metadata for the attachment can comprise the email generator collecting intention metadata from the sender, at 312. For example, if the sender attaches the document 350 to the email, the email provider or application may ask the user if they wish to generate intention metadata (e.g., ask if the sender has a specific intention for the attachment with regards to the recipient). As an illustrative example, the email generator may detect a file type for the attachment and ask the sender if they wish to generate intention metadata relevant to the file type (e.g., slideshow for pictures, highlight portions of doc for text-based files, provide captions for portions of the file or picture, etc.).

In one embodiment, the generating intention metadata for the attachment can comprise using sender generated intention metadata, at 314. For example, sender of the email may provide the intention metadata written in a form that allows for application to the attachment. In one embodiment, the intention metadata may comprise markup language code (e.g., XML). In this embodiment, the sender may generate (e.g., write) markup code for the intention metadata, for example, which can be applied to the attachment such that the sender intention for the attachment is indicated (e.g., when the email is opened and/or when the attachment is activated).

For example, in the exemplary embodiment 200 of FIG. 2A, intention metadata 208 may be written in XML. In this example, the XML intention metadata 208 comprises a first reference 210 to a first attachment (design1.jpg) and a second reference 212 to a second attachment (design2.jpg). In this example, the metadata may have been written by the sender, generated by the support application, and/or generated by the email generator (e.g., email provider or application).

Figure 3:
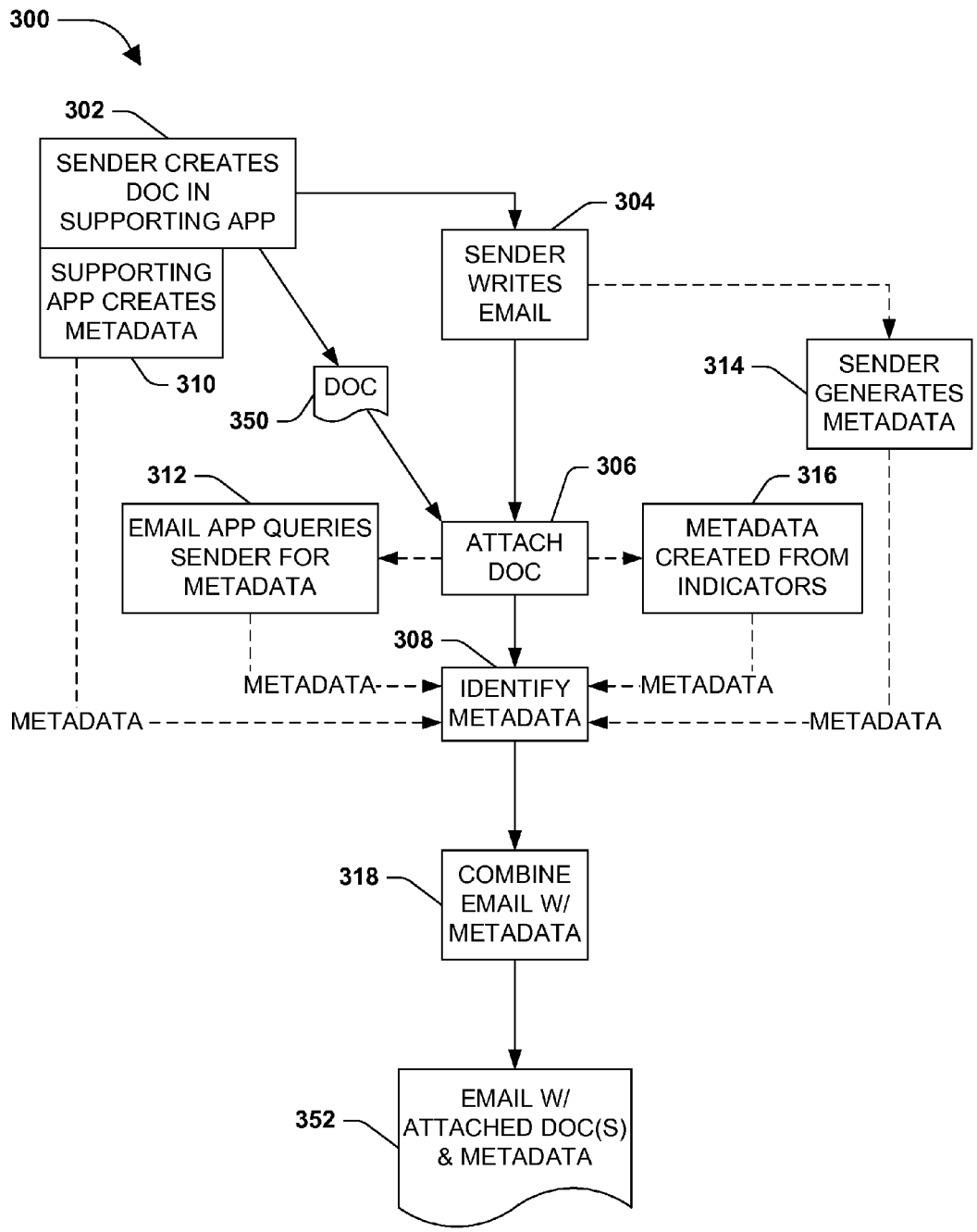
FIG. 3 is a flow diagram illustrating an example embodiment of one or more portions of a method for providing a rich email experience for an email with an attachment.

In another embodiment, the intention metadata can be generated from an intention indicator in a body portion of the email, at 316 in FIG. 3. In this embodiment, a body of the email can be examined for an indicator of the sender intention for the attachment. Further, in one embodiment, the examining of the body of the email for an indicator of the sender intention for the attachment can comprise performing a natural language search to identify a natural language indicator of the sender intention for the attachment.

For example, in the example embodiment 200 of FIG. 2A, the body of the email 202 can be examined to determine whether there is a reference to one or more of the attachments. In this example, the attachments comprise JPEGs, which are referenced as Design1.jpg 204 and Design2.jpg 206. Further, the body portion 202 of the email can be examined to identify intent indicators for the attachments. In this example, the sender intent may comprise the recipient viewing the respective attachments, and a caption "Endurance brand in a tropical sky design" may be applied to the Design1.jpg attachment, and a caption "Lastmore brand in an ocean view design" may be applied to the attachment Design2.jpg, as intent metadata.

In one embodiment, the identified intention metadata (e.g., identified at 308 of FIG. 3) can comprise metadata that indicates at least a portion of the attachment that the sender intends for the recipient to view. For example, in FIG. 2A, the markup code for the intention metadata 208 comprises an indication 210 that a portion of the attachment Design1.jpg is intended to be viewed, as defined by coordinates. As another example, the metadata may indicate merely a page or paragraph of a document, a particular graphic, or any other portion of an attachment.

In another embodiment, the identified intention metadata can comprise metadata that indicates an action on at least a portion of the attachment that the sender intends to occur. As an example, the metadata for Design1.jpg 210 indicates a "BoxZoom" function for a portion of the attachment indicated by the coordinates. In this example, a BoxZoom action can comprise creating a box around the desired portion of the document and zooming into the detail of the boxed portion. As another example, the metadata may indicate starting a slideshow of images in a particular order, activating a particular embedded application, and/or any one or more functions that can be applied to an attachment.

In another embodiment, the identified intention metadata can comprise metadata that indicates a caption associated with at least a portion of the attachment that the sender intends to be viewed in association with the portion of the attachment. For example, most standard image formats with good compression do not support annotations. However, when viewing a picture, the viewer may wish to have a caption that describes what they are looking at, and/or the title of the image file. In FIG. 2A, as described above, the intention metadata can comprise captions for the Design1.jpg and Design2.jpg attachments, such as "Endurance brand in a tropical sky design" for Design1.jpg, "Lastmore brand in an ocean view design" for Design2.jpg.

In FIG. 3, at 318, the intention metadata is combined with the email. In one embodiment, the combining can comprise incorporating the intention metadata into at least a portion of the email. For example, the intention metadata can be incorporated into the body portion of the email, and/or a header portion of the email. In the example embodiment 220 of FIG. 2B, for example, the metadata 230 can be derived for the one or more attachments 226 and incorporated into the email body and/or header 222. As another example, in FIG. 2A, the intention metadata 208 is incorporated into the body portion 202 of the email, such as in markup language code form.

In one embodiment, the combining can comprise attaching a metadata file to the email, where the metadata file comprises the intention metadata. For example, as illustrated in FIG. 2B, a metadata file 228 can be created for the metadata 230, and the metadata file 228 can be attached 224 to the email 222 with the other attachments 226. As an illustrative example, the metadata file can comprise markup language code (e.g., 208 of FIG. 2A), and comprise a file type that may be recognized by an email provider or application as an intention metadata file.

In the example embodiment 300 of FIG. 3, the combination of the intention metadata with the email can result in an email comprising the attachment(s) and the intention metadata 352. As an illustrative example, in FIG. 2B, an email that is sent by the sender's email provider or application can comprise the attachments 224, and the email header and body. In this example, the attachments can comprise the attached files 226, and in one embodiment, the attached metadata file 228. In another embodiment, the email header and/or email body 222 may comprise the metadata 230.

Figure 2C:
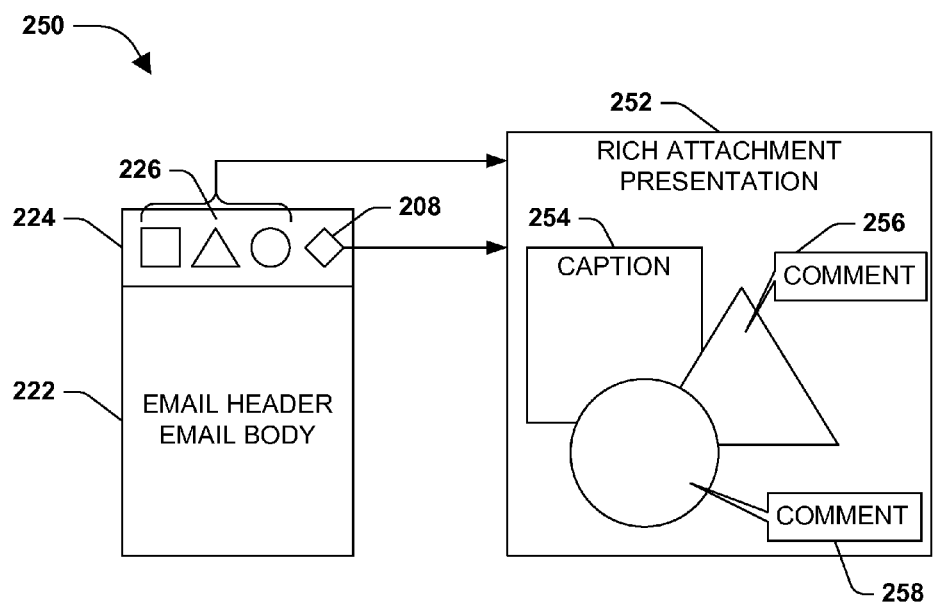
Figure 4:
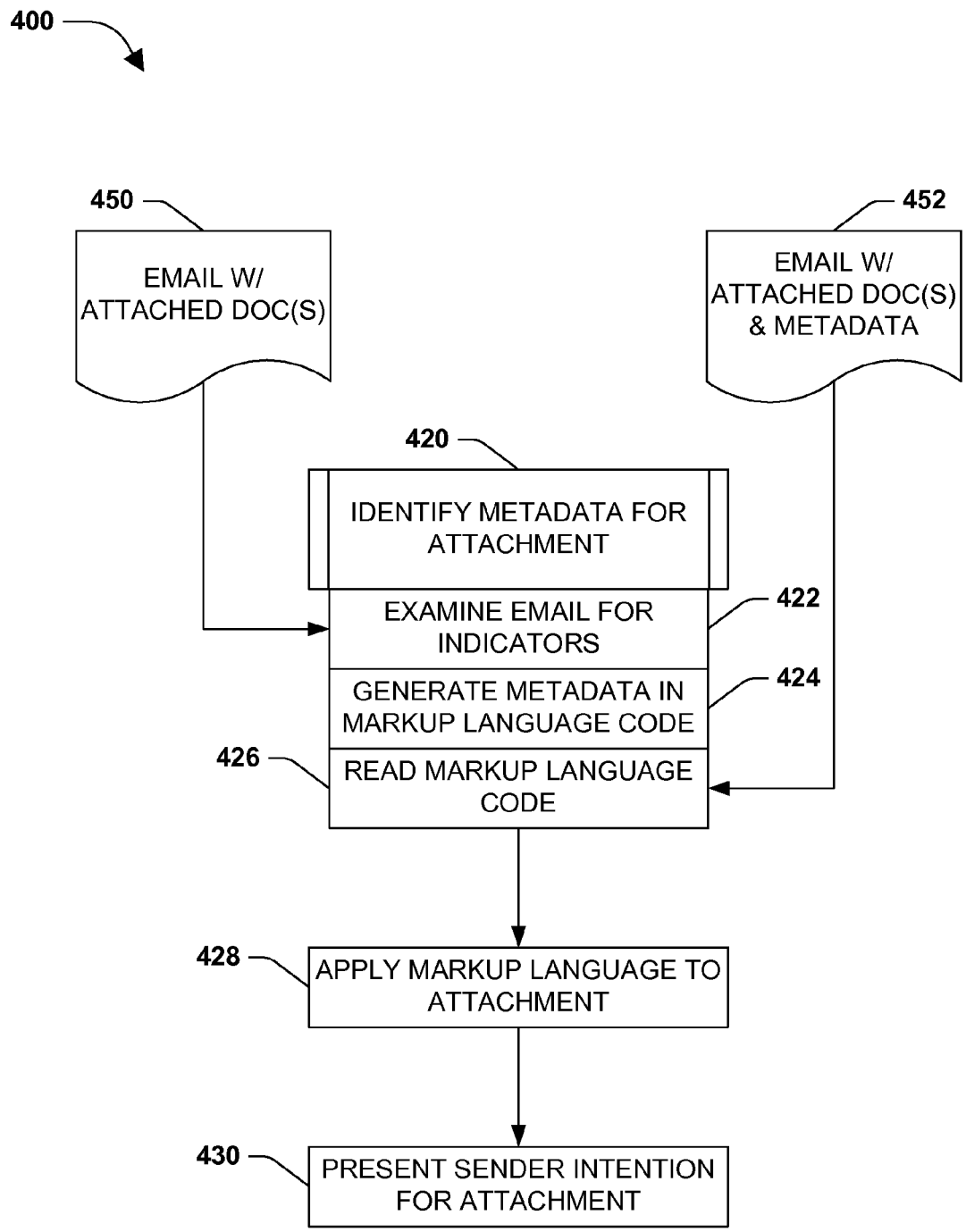
FIG. 4 is a flow diagram illustrating an example embodiment of one or more portions of a method for providing a rich email experience for an email with an attachment.

FIG. 2C illustrates and exemplary embodiment 250 where one or more techniques described herein may be implemented. For purposes of illustration and not limitation FIG. 2C is described in reference to FIG. 4, which is a flow diagram illustrating an example embodiment 400 of one or more portions of a method for providing a rich email experience for an email with an attachment. At 420, intention metadata associated with an attachment to an email is identified. In one embodiment, the identification of the intention metadata and/or application of the intention metadata can be performed at the recipient's email provider or application, for example. In this example embodiment, identifying the intention metadata may comprise a different process for email comprising merely one or more attachments 450, and emails comprising one or more attachments and identified intention metadata 452.

At 422, in one embodiment, as described above, identifying the intention metadata can comprise examining the body of the email for an indicator of the sender intention for the attachment, for example, by performing a natural language search for natural language indicators of the sender intention. In this embodiment, the email and the one or more attachments 450 are examined, and intention indicators that reference the one or more attachments can be used to generate metadata, at 424. For example, the email body may comprise the phrase "please execute your signature on pages two, seven and 14 of the attached document Loan_papers.xps." In this example, metadata may be generated for the attachment that, when applied to the attachment, displays merely the appropriate pages.

At 426, the intention metadata is identified; and in one embodiment, where the metadata comprises markup language code, the code can be read, such as by the email provider or application. In one embodiment, identifying the intention metadata can comprise reading the metadata file attached to the email 452 that comprises the intention metadata. In another embodiment, identifying the intention metadata can comprise examining at least a portion of the email 452 for the intention metadata. In this embodiment, the portion of the email can comprise the header portion, and/or the body portion (e.g., reading the markup code 208 in the body 202 of the email, in FIG. 2).

At 428, the intention metadata can be applied to the one or more attachments, for example, by applying the markup language code describing the sender intention(s) to the attachments. In one embodiment, the intention metadata can be applied to the attachment such that the sender intention is applied when the attachment is activated. For example, the recipient of the email may view the attachment, at which point the sender intention for the attachment is applied. In another embodiment, the intention metadata can be applied to the attachment such that the sender intention for the attachment is displayed in a body portion of the email. For example, when the recipient opens the email, the sender intention for the attachment is displayed in the email body.

As an illustrative example, in the example embodiment 250 of FIG. 2C, the email body and header 222, and the attachments 224 comprising the attached files 226, and in one embodiment, the attached metadata file 208, may arrive at the recipient's email provider or application. The recipient may open the email, and in one embodiment, at 430 of the example embodiment 400, a rich attachment presentation 252 is presented to the recipient. In this example, the rich presentation for the attachments can be presented in the email body, where a caption 254 may be shown for an image and comment 256, 258 may be applied to a portion of one or more attached documents.

In another embodiment, the presentation to the recipient, at 430 of the example embodiment 400, may occur when the recipient activates one of the attachments. For example, in FIG. 2C, when the recipient opens the attached image file the caption 254 can be displayed with (e.g., in or near) the image. Further, in this example, when the recipient opens the attached document files, merely those portion specified by the applied intention metadata can be displayed, along with the sender's comments 256, 258.

It will be appreciated that the rich attachment presentation is not limited to the example embodiments described above. It is anticipated that those skilled in the art may devise alternate rich attachment presentations that are facilitated by intention metadata associated with attachments to an email. For example, there are techniques currently used where an email sender can request a "read" receipt, which is activated when the recipient reads the email. In one embodiment, the intention metadata may be applied to an attachment, such that when the attachment is read (e.g., or some other intended action is performed) an "action performed" receipt may be generated for the attachment.

A system may be devised that provides for a rich presentation of email attachments Metadata that indicates an email sender's intent for the attachment(s) may be used to present e-mail attachments in a richer format to a recipient of the email, such as in a body of the email, and/or when the attachment is activated (e.g., opened). In this way, for example, attachments may be sequenced for viewing in a desired manner, important portions of documents can be highlighted and presented to the recipient, captions may be added to images, and/or attachment open/download confirmations can be provided, among other things.

Figure 5:
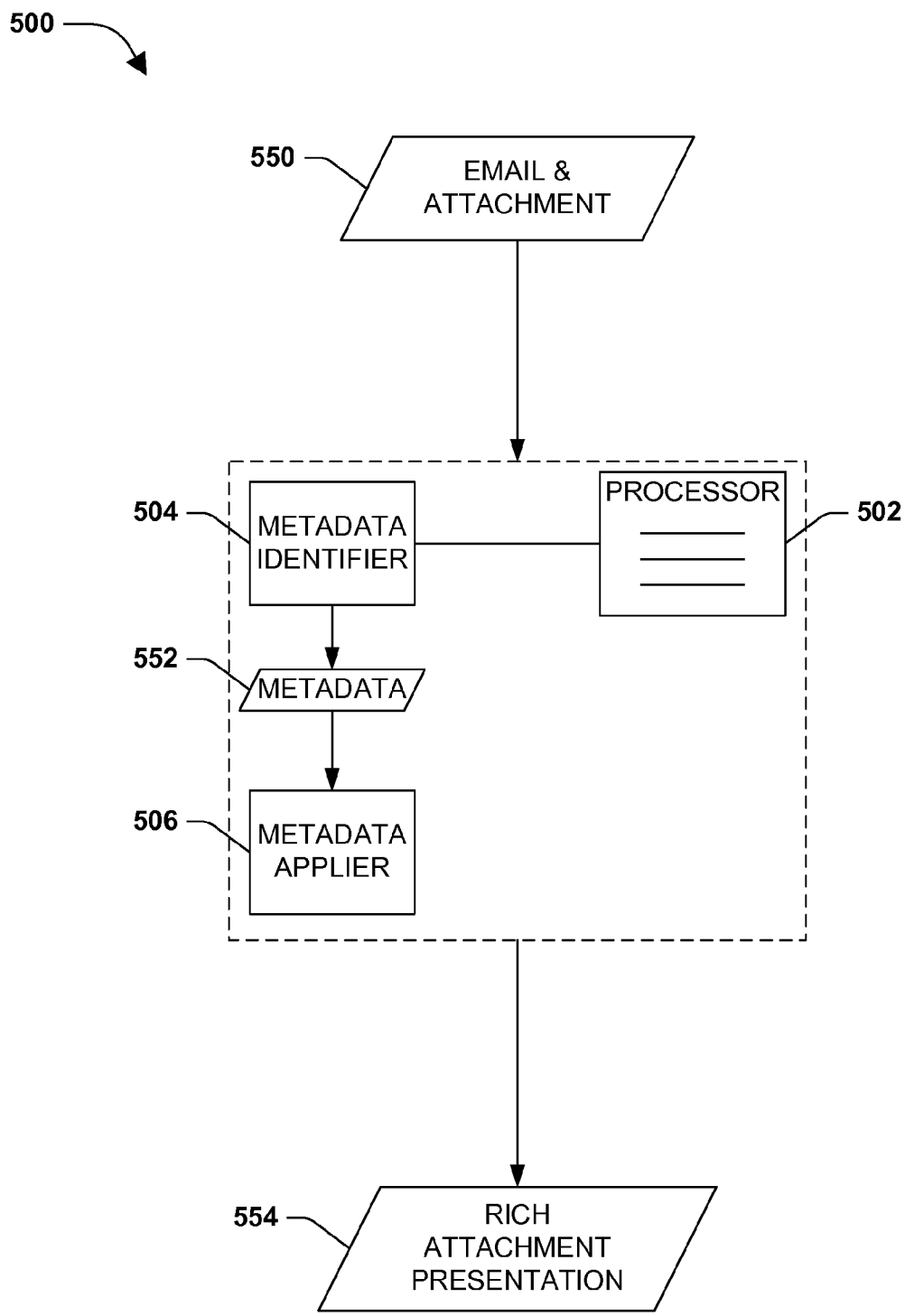
FIG. 5 is a component diagram of an exemplary system for providing a rich email experience for an email with an attachment.

FIG. 5 is a component diagram of an exemplary system 500 for providing a rich email experience for an email with an attachment. A processor 502 is configured to process data for the system 500, and is operably coupled with a metadata identification component 504. The metadata identification component 504 identifies intention metadata 552 that indicates a sender intention for the attachment to the email 550. A metadata application component 506 is operably coupled with the metadata identification component 504, and it applies the intention metadata 552 to the attachment such that a recipient can identify the sender intention for the attachment, in a rich attachment presentation 554, for example.

In one embodiment, the exemplary system 500 may be coupled with a sender's email provider or application. As an example, the sender can write an email and attach a desired file 550 (e.g., word processor document). The metadata identification component can identify the intention metadata 552 (e.g., metadata that indicates the sender's intention for the attachment, such as merely show desired portions of the document), and the metadata application component can apply it to the attachment. In this way, in this example, when the recipient opens the email, and/or opens the attachment, they will experience a rich attachment presentation 554, such as merely the sender indicated portions of the document being displayed in a zoomed in manner (e.g., in the email, or in a supporting application).

In another embodiment, the exemplary system 500 may be coupled with a recipient's email provider or application. As an example, the recipient may receive the email and attachment 550, and the metadata identification component 504 can identify the intention metadata 552 for the attachment, and the metadata application component 506 can apply the identified intention metadata 552 to the attachment. In this example, when the recipient opens the email, and/or opens the attachment, they will experience a rich attachment presentation 554.

In another embodiment, one or more portions of the exemplary system may be coupled with the sender's email provider or application, and one or more portions of the exemplary system 500 may be coupled with the recipient's email provider or application. For example, the metadata identifier may identify the intention metadata 552 on the sender's side before the email is sent. Further, in this example, the metadata applier may apply the identified intention metadata to the attachment on the recipient side, after the email is received.

Figure 6:
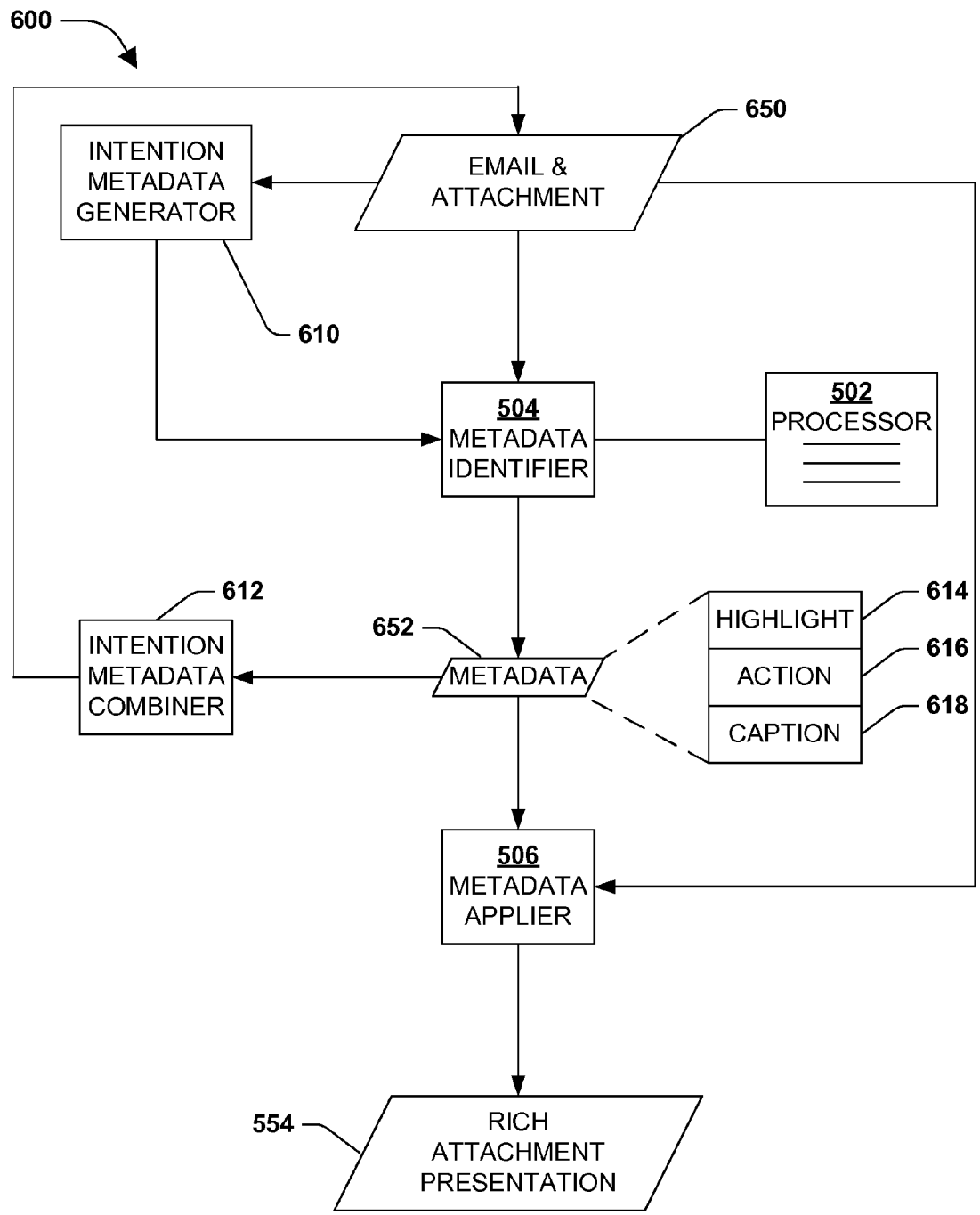
FIG. 6 is a component diagram illustrating an example embodiment of one or more portions of a system for providing a rich email experience for an email with an attachment.

FIG. 6 is a component diagram illustrating an example embodiment 600 of one or more portions of a system for providing a rich email experience for an email with an attachment. The system comprises the processor 502 metadata identification component 504. In this example embodiment 600, the intention metadata 652 can comprise markup code (e.g., extensible markup language (XML) based code). Further, the markup code may be configured to bring a portion of the attachment to the recipient's attention, such as by highlighting 614 one or more portion of the attachment (e.g., a boxzoom function).

Additionally, the intention metadata 652 can comprise markup code that is configured to apply an action 616 on one or more portions of the attachment, such as presenting a slideshow of images in a desired sequence. As another example, the action performed by the application of the markup code may comprise activating an action receipt confirmation for the sender. The intention metadata 652 may also comprise markup code that is configured to provide a caption 618 for an associated portion of the attachment, such as by taking a tile of the file, and/or a desired description and adding the same to a presentation of one or more portions of the attachment.

An intention metadata generation component 610 is configured to generate intention metadata for the attachment to the email 650 and provide the same to the identification component 504. The intention metadata generation component 610 may generate intention metadata by identifying an intention indicator in a body portion of the email 650, collecting intention metadata from the sender, using sender generated intention metadata; and/or using intention metadata generated by an application that supports the attachment, for example.

In one embodiment, such as where the exemplary system 600 is coupled with the sender email provider or application, an intention metadata combining component 612 may combine the intention metadata with the email, such as prior to sending to the recipient. In this embodiment, the intention metadata combining component 612 can combine the intention metadata 652 with the email by attaching a metadata file to the email, where the metadata file comprises the intention metadata. In another embodiment, the intention metadata combining component 612 can combine the intention metadata 652 with the email by incorporating the intention metadata into at least a portion of the email, such as the email header, and/or email body. The metadata application component 506 can then apply the intention metadata to one or more attachments in a desired manner to yield the rich attachment presentation 554 so that a recipient has an enhanced experience that is consistent with the intention of the sender, for example.

Figure 7:
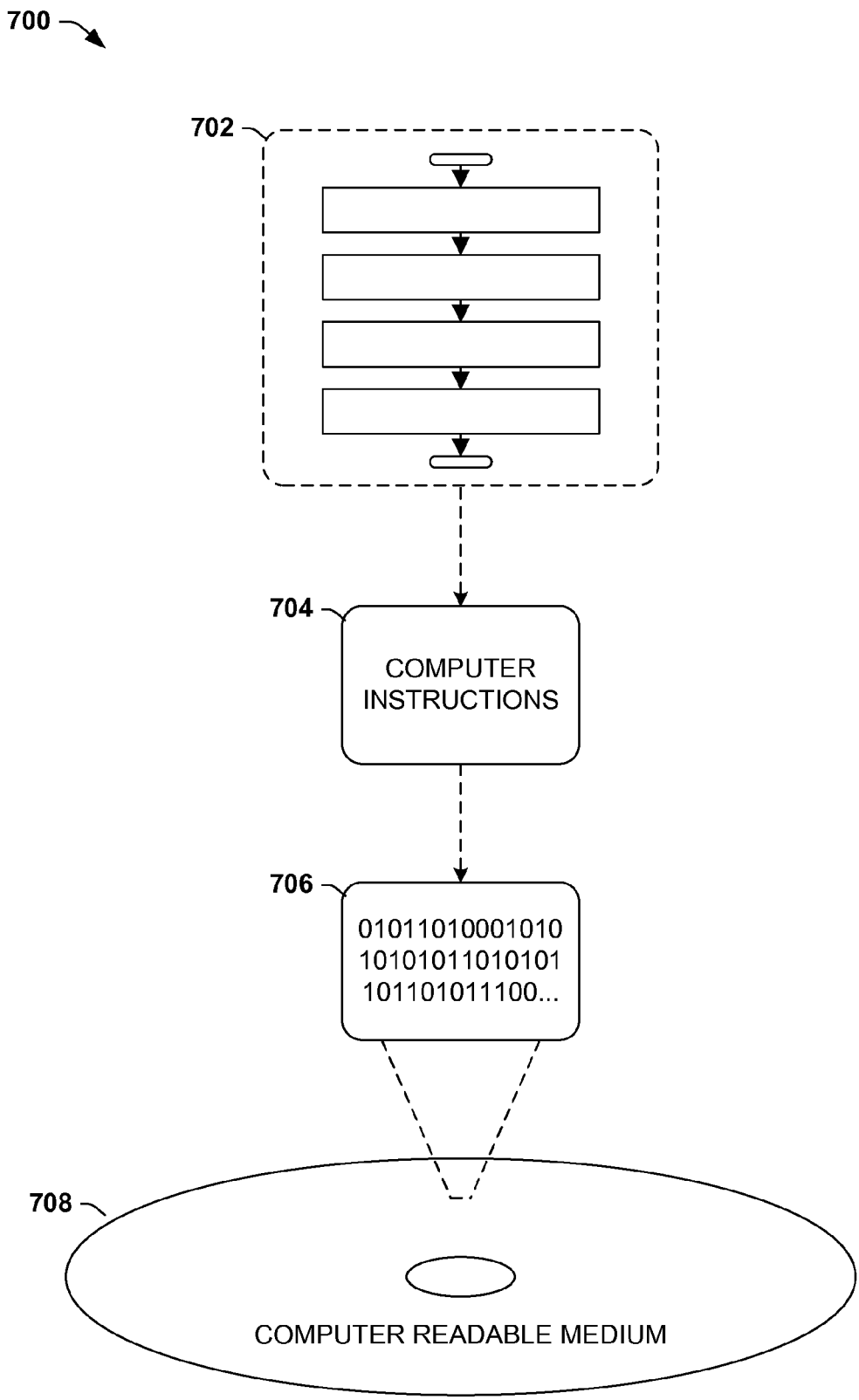
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
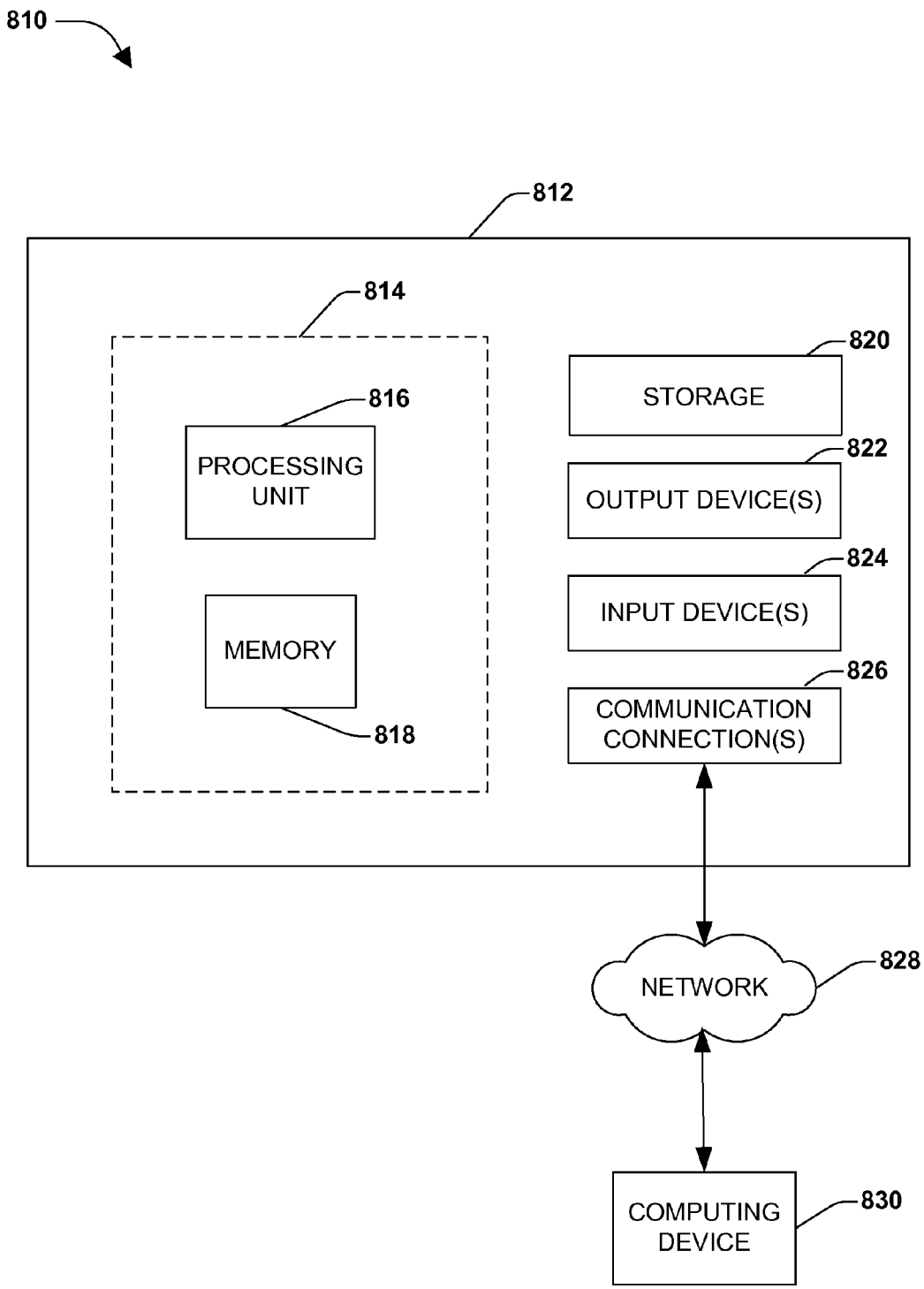
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method, comprising:
    automatically identifying intention metadata associated with an attachment to an email based upon at least one of a body of the email or a header of the email, where the attachment comprises a text-based file or an image file and where the intention metadata indicates a sender intention for presentation of the attachment with a first portion of the attachment comprising a first portion of the text-based file or a first portion of the image file highlighted and with a second portion of the attachment comprising a second portion of the text-based file or a second portion of the image file highlighted; and
    applying the intention metadata to the attachment such that a recipient can identify the sender intention for the attachment, applying the intention metadata comprising applying the intention metadata to the attachment such that the sender intention for the attachment is displayed in the body of the email.

2. The method of claim 1, automatically identifying the intention metadata comprising reading a metadata file attached to the email that comprises the intention metadata.

3. The method of claim 1, automatically identifying the intention metadata comprising examining at least a portion of at least one of the body or the header.

4. The method of claim 1, the attachment comprising the text-based file.

5. The method of claim 1, automatically identifying the intention metadata comprising examining the body for a natural language indicator.

6. The method of claim 1, the intention metadata comprising metadata that indicates one or more of:
    an action on one or more portions of the attachment that a sender intends to occur; or a caption that the sender intends to be viewed in association with at least some of the attachment.

7. The method of claim 1, the attachment comprising the image file.

8. The method of claim 1, applying the intention metadata comprising applying the intention metadata to the attachment such that the sender intention is applied when the attachment is activated.

9. The method of claim 1, the first portion of the attachment different than the second portion of the attachment.

10. The method of claim 1, comprising generating at least some of the intention metadata for the attachment.

11. The method of claim 10, generating at least some of the intention metadata for the attachment comprising generating a portion of the intention metadata from an intention indicator in the body portion of the email.

12. The method of claim 10, generating at least some of the intention metadata for the attachment comprising collecting a portion of the intention metadata from a sender.

13. The method of claim 10, generating at least some of the intention metadata for the attachment comprising using sender generated intention metadata.

14. The method of claim 10, generating at least some of the intention metadata for the attachment comprising using intention metadata generated by an application that supports the attachment.

15. The method of claim 1, comprising combining the intention metadata with the email comprising at least one of:
  attaching a metadata file, comprising the intention metadata, to the email; or
  incorporating the intention metadata into at least a portion of the email.

16. A computer readable storage device comprising instructions that when executed, perform a method, comprising:
  automatically identifying intention metadata associated with an attachment to an email based upon at least one of a body of the email or a header of the email, where the attachment comprises a text-based file or an image file and where the intention metadata indicates a sender intention for presentation of the attachment with a first portion of the attachment comprising a first portion of the text-based file or a first portion of the image file highlighted; and
  applying the intention metadata to the attachment such that a recipient can identify the sender intention for the attachment, applying the intention metadata comprising applying the intention metadata to the attachment such that the sender intention for the attachment is displayed in the body of the email.

17. A system, comprising:
one or more processing units; and
memory comprising instructions that when executed by at least one of the one or more processing units perform operations comprising:
  automatically identifying intention metadata associated with an attachment to an email based upon at least one of a body of the email or a header of the email, where the attachment comprises a text-based file or an image file and where the intention metadata indicates a sender intention for presentation of the attachment with a first portion of the attachment comprising a first portion of the text-based file or a first portion of the image file highlighted; and
  applying the intention metadata to the attachment such that a recipient can identify the sender intention for the attachment, applying the intention metadata comprising applying the intention metadata to the attachment such that the sender intention for the attachment is displayed in the body of the email.

18. The system of claim 17, automatically identifying the intention metadata comprising reading a metadata file attached to the email that comprises the intention metadata.

19. The system of claim 17, automatically identifying the intention metadata comprising examining at least a portion of at least one of the body or the header.

20. The system of claim 17, automatically identifying the intention metadata comprising examining the body for a natural language indicator.

\* \* \* \* \*